May 22, 1956  P. J. McGAULEY ET AL  2,746,859
METHOD OF RECOVERING NON-FERROUS METAL VALUES
Filed Dec. 22, 1951
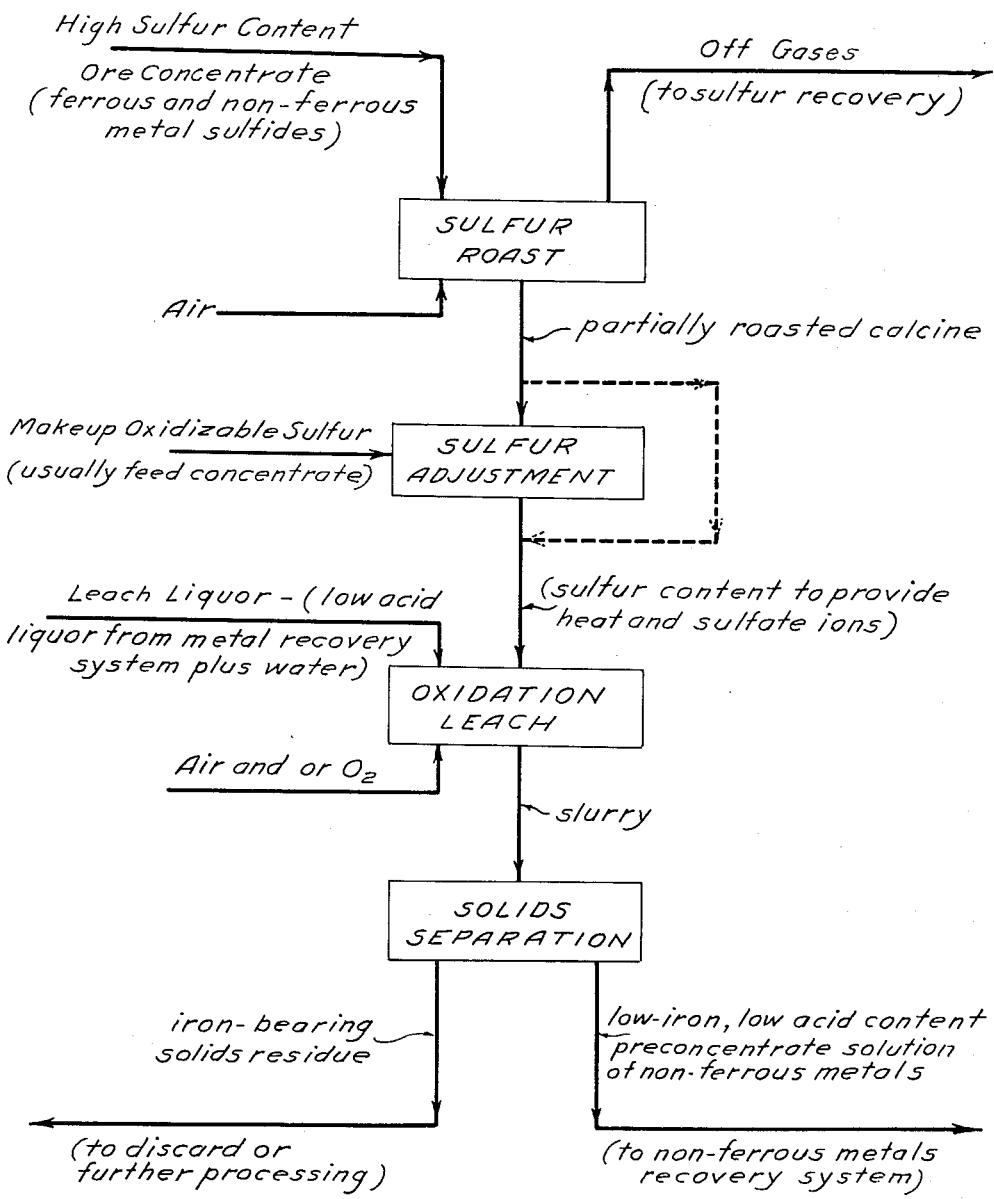
INVENTORS
PATRICK J. McGAULEY,
SIDNEY NASHUER,
VAL. KUDRYK,
BY United States Patent Office 2,746,859
Patented May 22, 1956

2,746,859

METHOD OF RECOVERING NON-FERROUS METAL VALUES

Patrick John McGauley, Port Washington, Sydney Nashner, Roslyn, and Val Kudryk, New York, N. Y., assignors to Chemical Construction Corporation, New York, N. Y., a corporation of Delaware Application December 22, 1951, Serial No. 262,988

5 Claims. (Cl. 75—115)

This invention relates to the chemical recovery of non-ferrous metal values from sulfur-bearing ores or ore concentrates thereof. More particularly, it deals with such processes which use an oxidation leach in an aqueous medium to convert insoluble metal sulfides into dissolved metal sulfates. Still more specifically, it is concerned with processes wherein such non-ferrous metals values as those of copper, nickel, cobalt and zinc may be readily and economically recovered from high-sulfur, low-arsenic content, ore concentrates by utilizing a novel combination of roasting and leaching techniques.

Such useful or desirable non-ferrous metals as copper, nickel and cobalt, as well as cadmium, lead, gold, silver and zinc, frequently occur as sulfide ores in nature. Unfortunately, they seldom occur alone or in desirably high concentrations. Usually they occur in combinations with each other or with arsenides or as sulfur-arsenic minerals, together with diluent metal minerals such as those of iron and with various useless or inert gangue materials. Industrially, then, such ores present not only the problems of removing gangue and diluent minerals, to raise the grade, but also those of recovering the metals values from the ore concentrates and separating these values from each other.

Heretofore, the most important conventional processes of recovering copper, nickel and cobalt values, for example, from their sulfide ores have involved many steps. Usually the valuable sulfides in the ore must be freed of gangue, as by gravity separation, froth flotation, or the like. This may be followed by roasting the concentrate, to remove volatile oxides and some sulfur; adding silica and calcium carbonate to the roasted ore, and heating the mixture in a reverberatory furnace to form a sulfide "matte." This "matte" is then oxidized to metal, as for example in a special Bessemer-type converter to obtain a crude bullion of mixed metals which is usually cast into cakes or anodes and dissolved electrolytically in an acid electrolyte, i. e., sulfuric acid. Further separation and recovery of the metals involves chemical purification of the electrolyte and removal and retreatment or purification of the different metals by various methods.

The desirability of a more direct method of extracting nonferrous metals from their ores and concentrates without smelting has long been recognized. Leaching followed by chemical precipitation appears to offer one solution. Many attempts have been made to achieve this result. In general, these attempts have failed to receive commercial acceptance. There are various reasons therefor. For example, most metallic sulfides, at present in the ore concentrates, are not directly soluble in water or in any other practical solvent, by conventional methods.

Attempts have been made to partially overcome this drawback by roasting the concentrate to form acid-soluble oxides or water-soluble sulfates of the valuable metals. In practice, however, this has usually proved unsatisfactory. Roasting at too low temperatures results in non-selective conversion of both valuable and diluent metals to soluble form, low equipment capacity and poor elimination of sulfur and/or arsenic. Excessively high temperatures frequently produce non-soluble compounds, probably ferrites. Control of the roaster atmosphere is equally important. Optimum conditions for producing sulfates of the mineral values are not necessarily those for the desired iron and sulfur reactions.

As a result, the previous roasting proposals employed either: (a) an unsatisfactory compromise; or (b) a carefully controlled series of operations. Perhaps the best of these is shown in U. S. Patent No. 1,674,491. There, a series of roasting steps at progressively and carefully controlled conditions are proposed. Even this is not commercially satisfactory for several reasons. The requisite temperature control in each step can not be maintained in commercial production equipment. The resultant poor driving conditions require too long a time cycle for each step. The apparatus requirements necessary to maintain a commercially useful solids throughput under the specified conditions are excessive. Not the least of the objections, is that in the final stage, the calcine is treated sufficiently to produce non-soluble ferrites in quantities offsetting any inherent economic advantages over conventional smelting and allied operations.

As a result of these various factors, no combination of direct roasting and water or acid leaching of sulfide concentrates has resulted in a wholly satisfactory commercializable process. None have proved sufficiently economical to be adopted commercially on a scale to be expected of a successful solution of the problem. The various proposals have proved uneconomical with respect to metal extraction or product grade or both.

More recently, processes have been developed for directly leaching ferrous and non-ferrous sulfide ores and ore concentrates of high arsenic content. These have been developed by subjecting an acqueous slurry of the ore concentrates to high-temperature, high-pressure oxidation leaching, thus converting the minerals directly to dissolved sulfates and arsenates. Under such conditions the iron and the arsenic are precipitated as insoluble iron arsenates, to the extent of the mol equivalents of each in the feed. Excess arsenates, if any, are then precipitated with calcium or barium compounds. Metallic ions, including iron if present in excess of the arsenic, go into and remain in solution as sulfates, and any excess sulfur is oxidized to sulfuric acid.

Processes of this type are described and claimed in the copending applications for United States Letters Patent, Serial No. 206,891, filed on January 19, 1951, by P. J. McGauley, one of the present inventors, together with F. A. Schaufelberger, now Patent No. 2,686,114, issued August 14, 1954, and Serial No. 206,892 also filed by P. J. McGauley on January 19, 1951, together with P. J. Masur and V. Kudryk, now abandoned.

Since arsenic, and iron up to an amount equivalent to the arsenic, can be eliminated from sulfide concentrates containing nickel, copper, cobalt and zinc minerals, by these processes, the latter are excellent when they can be used. However, the oxidation step requires the addition of oxygen, or air, under pressure. When treating a concentrate the arsenic content of which is stoichiometrically equivalent to less than about 5% of the iron, the resultant production of soluble iron sulfates and excess sulfuric acid serves no useful purpose. On the contrary, their presence in the leach liquor not only dilutes and contaminates the latter, but the consumption of pressurized air or oxygen in their production becomes an expensive operation, undesirably increasing the cost of producing the desired metals. Accordingly, these processes are not too well suited to treating high-sulfur, low-arsenic content concentrates.

It is, therefore, the principal object of the present invention to devise a process of treating low-arsenic content sulfide ores which is not subject to these limitations.

Surprisingly, according to the present invention, it has been found that the more undesirable features of both the roasting and the high-pressure oxidation techniques may be obviated by using a proper combination of both. A partial roast, under optimum conditions for efficient sulfur-removal, is employed to eliminate some of the sulfur. Partially-roasted concentrate is slurried with recycle liquor and the slurry is given a high-pressure oxidation leach. In this combination of roasting and oxidation leaching both are operated at far less than their potential capacity when used alone. However, the overall process produces more efficient, economical results than are obtainable in either of the above-discussed previous proposals.

The general operating steps are shown in the accompanying drawing which is a simplified flowscheme showing the principal steps in a preferred operational procedure.

While the present process may be practiced on a whole ore, ordinarily this would be wasteful of apparatus capacity and hence uneconomical. It can be assumed that for all practical purposes the feed to the process will be either a very high grade ore or some sort of concentrate. This latter may be one obtained by simply removing gangue and/or diluent minerals as by washing, gravity separation, froth flotation or the like. These steps, or their equivalents, are well known and form no part of the invention. On the other hand, the concentrate may be one obtained as a by-product in processing an ore or concentrate in some other operations for other purposes.

Removal of sulfide sulfur by roasting is the first actual step in the process. Such removal is more economical than conversion to sulfuric acid or ferric sulfate during the high pressure oxidation leaching. However, excessive sulfur removal should be avoided. A preliminary consideration, therefore, is the determination of the amount of sulfur to be so removed. This requires two considerations. During the subsequent oxidation leaching there must be available an amount of sulfur stoichiometrically equivalent to form sulfates of the non-ferrous metal values. In addition, since the sulfur oxidation is exothermic, it is desirable to have present a sufficient amount of sulfide sulfur to maintain the desired temperature of operation. The presence of a small excess, some 2–5%, of sulfur in the calcine, therefore, may be and usually is desirable.

Both of these criteria are easily satisfied. From the assay of the concentrate and the known free sulfate ion content of the recycle liquor, the stoichiometric sulfur requirement in the calcine is easily calculated by difference. The specific heats and heats of formation are all known. From the concentrate assay and the proposed operating cycle, the heat requirements, and therefrom the sulfide requirement to furnish heat in leaching the calcine also may be calculated. In the average case, provision of sulfur on either basis will meet the requirements of the other.

As shown in the drawing, sulfur removal may be carried out in either of two ways. Roasting is carried out under optimum throughput conditions. Sulfur removal thereunder is efficient. However, the residual sulfur content will be incidental and often will be deficient for effective oxidation leaching. In such cases, only part of the feed to the leaching step is roasted. Roasted material is then admixed with additional sulfur-bearing material, usually additional but unroasted concentrate. This step is shown as a sulfur adjustment.

In this adjustment, additional sulfur may be supplied in any desired form. Preferably, it should be as an oxidizable sulfide. While other sulfides than those occurring in unroasted feed concentrate may be used, the latter are preferred because of the resultant increase in overall treating capacity. Concentrate, also partially roasted but having a higher sulfur content may be used for the purpose if so desired, as may sulfide concentrates from some other plant operation.

In the alternative plan, the whole feed is roasted but partially, and then only to the specific sulfur content determined by the criteria discussed above. In this procedure, the sulfur adjustment step is unnecessary and may be omitted, as shown by the dotted flow line.

It is an advantage of the present invention that in general, substantially any available roasting equipment may be used. Roasting time and temperature will vary in accordance with such factors as the type of equipment used and the particle size, moisture content, nature and quantity of the material being roasted. Techniques for such operations and equipment therefor are well known. Except as to the sulfur content to be produced, the specific roasting technique used does not enter into the patentable features of this invention.

It is a particular advantage of the present process that, unlike the prior art proposals, precise control of the roasting is not required. For example, in the process of the above-noted patent, it is essential to control both temperature and furnace atmosphere throughout the entire operation. Both must be exactly, but differently, controlled at several different stages. In operating a roaster for the purposes of the present invention, the temperature is simply raised quickly to a level suitable for effective sulfur removal. Except for the necessity of removing the off-gases, the roaster atmosphere may be ignored. Optimum solids throughput becomes the controlling factor and not the necessity for obtaining a metallurgical result. Control of the residual sulfur content is obtained by maintaining a throughput rate high enough to prevent roasting beyond the desired content, at the prevailing operating conditions.

One precaution should be observed. Excessive overroasting produces a calcine containing insoluble material, apparently ferrite-type compounds. It is generally wise to avoid reducing the sulfur content to less than about 70% of the stoichiometric requirements since going below this content increases the danger of producing these compounds. However, this is unlikely to occur, unless the pyrite content is very exceptionally high, so long as the roaster is operated to obtain optimum throughout performance. Therefore, where in the present specification and claims the terms "efficient roasting" or "efficient sulfur-removal" are used, they imply the use of the equipment on a production basis for sulfur removal and not a metallurgical basis for selective conversion of non-ferrous metals to sulfates. Should the latter reaction occur to some extent it is not detrimental provided the sulfide sulfur remaining is sufficient to furnish required heat during subsequent leaching.

It is a further feature of the present invention that the combination of steps allows considerable flexibility in each. Consequently, no such precise control of the final sulfide content as is required in a conversional metallurgical roast is necessary. An approximate achievement of the desired final sulfide content is sufficient.

It is a still further feature of the present invention that under optimum roasting conditions much of the iron in the ore will remain in the insoluble residues after the leaching operations.

It is a still further advantage in the operation of the present process that sulfur removed in the roaster off-gases may be recovered. It may be taken as sulfur dioxide or it may be converted into free sulfur or into sulfuric acid by known methods. Such an operation may produce a valuable by-product of the present process and offset some part of the overall cost of operation of the present process.

As pointed out above, a slight excess of sulfur in the calcine is not necessarily harmful. Even when the sulfide sulfur in the calcine is stoichiometric to the non-ferrous metals therein, an excess thereover may be beneficial to the process, when a low acid content liquor is returned to the leaching operation, usually, as noted, to slurry the calcine. This latter will be the usual practice, since leaching is initially faster if this solution contains some free sulfuric acid. An initial content of some 3–5% $H_2SO_4$ in the acid is a good practice.

High concentrations of sulfuric acid after leaching should be avoided, not only for the reasons given but because they reduce the solubility of the non-ferrous metal sulfates in the leaching liquor and increase the solubility of iron and other diluents. Final acid concentrations above about 7% after oxidation should be avoided. Above about 10%, the changes in relative solubilities may noticeably affect the results. The recycled acid may be leach liquor directly recycled. However, it will more usually be liquor from which dissolved metal values have been removed.

In general, the roasted ore, as an aqueous slurry, is leached by being treated, in the presence of an oxidizing gas, at elevated pressures and at temperatures above the atmospheric pressure boiling point. In operation, the temperature conditions are perhaps the most important controls. In general, leaching operations are carried out at a temperature between about 250° F. and 650° F.; about 450° F. representing a good average practice.

Since the process employs an oxidizing leach, oxygen gas as the most practical agent must be present. It may be supplied either to the vapor phase or by sub-surface injection or by both. When supplied above the liquid-gas interface an $O_2$ pressure of at least 50 p. s. i. g. is needed for any reasonable operating practice, the optimum being more nearly 100 p. s. i. g. When using sub-surface injection the $O_2$ partial pressure is not an accurate measure of the oxygen available for the reaction but the same general controls will be observed. Above about 300 p. s. i. g. using air and 400 p. s. i. g. using oxygen unduly increases the apparatus requirements. Total pressures will depend on the temperature and the type of oxidizing gas used. Illustratively, in the average practice at about 450° F., the equivalent steam pressure is about 400–425 p. s. i. g. and the total autoclave pressure will range from about 600 p. s. i. g. using 95% oxygen, to about 900 p. s. i. g. using unenriched air.

If the oxidizing gas contains inerts, such as nitrogen, gas must be bled off and replaced to prevent the autoclave atmosphere from becoming too depleted in oxygen. For example, if 95% oxygen is used, an optimum of about 50% oxygen in the non-condensible fraction of the autoclave atmosphere should be maintained. For unenriched air the corresponding fraction should be about seven percent.

Lower oxygen contents can be maintained but the treatment time is correspondingly prolonged. Although there is a corresponding increase in efficiency of oxygen utilization at lower oxygen contents in the autoclave atmosphere, at appreciably lower contents the necessary increase in apparatus requirements offsets any savings therefrom. Conversely, use of too high an oxygen partial pressure is undesirable. Higher oxygen partial pressure can be produced either by using increased amounts, with the concomitant increase in power and apparatus costs, or by increasing the bleed rate with the resulting drop in efficiency of oxygen utilization. Either practice rapidly becomes uneconomical.

In this oxidation leaching step, some variations in the various operating conditions may be indicated by variations in the ore concentrate. As noted above, the amount of sulfur left in the calcine is adjusted by roasting to conform to one of two criteria. These criteria may be summarized as follows:

First, the sulfur content in the calcine plus the free sulfate ions in the leach liquor in which the calcine is slurried for leaching must at least be equal stoichiometrically to sulfates of the non-ferrous metal values so that the latter may be fully converted to sulfates during leaching. A slight excess of either sulfate or sulfide sulfur is desirable to provide a driving force for these reactions and to allow for any small proportion of the undissolved iron which after leaching may be present as a basic ferric sulfate. This sulfur excess normally should be in the range of 2–5% of the stoichiometric sulfur requirement for the non-ferrous metal values. It may be supplied either in the calcine or the slurrying liquor.

Secondly, the sulfide content in the calcine also should be great enough so that its heat of oxidation to sulfate during leaching, may meet the heat requirements of the process. This is desirable to minimize or avoid the use of high pressure steam. Where supply of heat is the controlling criterion, furnishing the excess sulfur as oxidizable sulfide sulfur in the calcine is preferable.

As also noted above, in the average case it is usually sufficient to satisfy either requirement. However, for other cases, the composition of the feed material and the various factors in the way leaching is to be conducted, may determine which is the limiting criterion in the predetermination of the desirable sulfur content to be left in the calcine.

If a rich concentrate, considered to be one in which the ratio of valuable non-ferrous metals to iron is 0.5 or higher, is being treated, the criterion of stoichiometry controls. The sulfur in such a rich concentrate will provide enough heat to permit continuous leaching at the proper temperature even with an unheated feed slurry, particularly when using oxygen. Even when using unenriched air more heat may be evolved than is needed. In such cases it may be necessary to condense steam from the vapor phase above the leach slurry. The dilution of the slurry leached must be great enough so that after leaching none of the valuable metal sulfates will exceed their solubility. Initially or during leaching, additional water should be added to compensate for vapor losses if any steam is condensed to control the leaching temperature.

For a lean concentrate, considered to be one with a ratio of valuable metals to iron of about 0.2 or less, it is desirable to conserve heat. A minimum amount of free sulfate should be present in the feed slurry and the slurry should be preheated, as by the use of flash steam, before leaching. Oxidation should best be accomplished with oxygen. Even using oxygen, there still may be enough heat evolved to carry the reaction unless extra sulfide sulfur is left in the calcine. In this case, the requirement of heat is the critical factor in the extent to which sulfur in the concentrate is to be removed by roasting.

With especially lean concentrates having a non-ferrous to ferrous ratio, for instance, of about 0.05, the presence of sulfide sulfur above stoichiometric quantities in order to supply heat, results in extraction of iron in amounts greater than the amount of non-ferrous metals present. If the non-ferrous metals include cobalt or nickel, the presence of this excess of iron in the solution complicates the subsequent non-ferrous metal recovery. It may, therefore, be desirable to preheat the solution to reaction temperature with steam and even if necessary to supply steam to the last part of the leaching reaction, rather than to obtain heat from the oxidation of iron sulfide.

As noted above, after the roasting and leaching much of the iron will remain in the insoluble residue. The slurry is treated to separate the residual solids from the liquor. The solids, containing most of the iron, after suitable washing, may be removed from the system. If they contain other metal values not dissolved during leaching the solids residue may be treated to recover them in some ancillary process which forms no part of the present invention. The liquor, and the washings, containing a dissolved preconcentrate of the non-ferrous metals as dissolved sulfates, is sent to some metals recovery system which also forms no part of the present invention.

By way of illustration, the following examples are given.

EXAMPLE 1

Samples of nickel-copper flotation concentrate of the following typical analysis:

| | Percent |
|---|---|
| Ni | 10.4 |
| Cu | 4.0 |
| Co | 0.2 |
| Fe | 36.4 |
| S | 28.9 | were made into an aqueous slurry using 100 parts of concentrate and about 300 parts of water containing about 10 parts of sulfuric acid. Slurry was transferred to a stirred autoclave; heated to about 450° F. and subjected to a pressure built up to about 600 lbs./sq. in. gauge with oxygen. Temperature and pressure were maintained for about two hours. About 37 parts of lime was added and heat and pressure continued for one hour. This second autoclaving period was necessary to convert the precipitated iron to a filterable form. The slurry was cooled by flashing to atmospheric pressure and the solids removed. The filtrate and solids were analyzed. Illustrative averaged results are shown in Table I (below).

EXAMPLE 2

Another portion of the same concentrate was roasted at about 1200° F. to a sulfur content of about 8%. About 100 parts of roasted concentrate was slurried using about 200 parts of water containing about 15 parts of sulfuric acid. Slurry was transferred to a stirred autoclave and the oxidation leaching at 450° F. of Example 1 was repeated for two hours, omitting the lime addition and second autoclaving step. Typical averaged results are also shown in Table I. The stoichiometric sulfur requirement is 8.4%. Since only 8% was left in the calcine, the remaining 0.4% was readily obtained from the 4.8 parts of sulfur in the sulfuric acid added.

EXAMPLE 3

Part of the roasted concentrate of Example 2 was further roasted in a laboratory muffle furnace until it contained only 0.23% S. This extra roasting treatment was expected to form ferrite-type compounds. 100 parts of this calcine was slurried using 200 parts of water containing 32 parts of $H_2SO_4$. Slurry was transfered to an autoclave and leached as in Example 2. The stoichiometric sulfur required was 8.8%, and the sulfuric acid used contained 10.4 parts sulfur. The results are given in Table I.

*Table I*

| | From Ex. 1, Unroasted Ore | From Ex. 2, Roasted Ore | From Ex. 3, Over-roasted Ore |
|---|---|---|---|
| Oxygen Consumed | 70 parts | 18 parts | 0 |
| Lime to Neutralize | 37 parts | 0 | 0 |
| Metals Leached: | | | |
| Ni | 99+% | 99+% | 42 |
| Cu | 99+% | 99+% | 35 |
| Co | 94+% | 97+% | 24 |
| Fe | 90% (before liming) | less than 3% | 8 |
| Sulfur Loss (neutralized) | 62% | 0 | 0 |
| Relative Autoclave Capacity (Concentrate treated) | 1 | 3 | 3.1 |
| Residue (dry basis) | 187 | 69 | 75 |

(NOTE.—All results are averaged and calculated to basis of 100 parts of unroasted concentrate.)

In the foregoing examples, the concentrate has a non-ferrous to ferrous metals value of about 0.4. Therefore, it can be considered in the "average" classification. Treatment of a different "average" ore is shown below.

EXAMPLE 4

A different ore, one in which cobalt, rather than nickel, is the primary value, was found to assay:

| Assay, percent by Weight | Parts S Required |
|---|---|
| Co—3.3 | 1.77 |
| Ni—4.3 | 2.32 |
| Cu—2.8 | 1.41 |
| Pb—1.5 | .24 |
| Fe—35.7. | Total___5.74 |
| S—44.5. | |

The ratio is 0.33 (including lead) for non-ferrous to ferrous metals. The concentrate was calcined in a Wedge roaster at temperatures up to 1800° F. to a product 75% by weight containing 5.9 parts of the sulfur, a sulfur content of 7.9%. About 7.5 parts of calcine was slurried in 180 parts of solution containing 10 parts of $H_2SO_4$ and leached for two hours at 450° F. and 600 p. s. i. g. in an atmosphere of oxygen, cooled by flashing to atmospheric pressure and filtered. In a series of tests, better than 98% extractions of Co, Ni and Cu were obtained with an oxygen consumption of 12 parts. Less than 3% of the iron was extracted.

Treatment of this ore on an unroasted basis, as in Example 1, would be impractical. Some 89 parts of oxygen and 50 parts of lime would have been required. Less than 25% as much ore could have been treated in the same time, in the same autoclave. The residue would have been five times as large.

In the foregoing examples it has been shown that the combined process of this invention produces excellent extractions of non-ferrous metals far more advantageously than by oxidation leaching of unroasted concentrate. Even over-roasting, with formation of ferrite-type compounds, gives a calcine from which good extractions can be made using a large excess of sulfuric acid. However, this excess acid usage also extracts a large amount of iron. Therefore, such roasting to such large sulfur-deficiencies or as to produce ferrites should be avoided. This is shown in the following example.

EXAMPLE 5

The concentrate of Example 4 was roasted at a lower rate to the same temperature. More air was admitted and gas firing was needed. The calcine, 72% by weight, contained less than 1% S. The non-ferrous metals were presumed to be in ferrite-type compounds. Several leaching tests were made for two hours at 450° F. with and without oxygen and with varying quantities of sulfuric acid. On this over-roasted calcine, oxygen had little effect. With 18–30 parts of sulfuric acid per 72 parts calcine (1 to 1.67 times stoichiometric for non-ferrous metals) results were very similar to those of Example 3—that is 5 to 10% extraction of iron and 20 to 60% extraction of the non-ferrous metal values. However, with 45 parts of sulfuric acid, leaching without air or oxygen extracted over 95% of each of the non-ferrous metals, but 23% of the iron was also extracted.

It was noted above that roasting to a residual sulfur content less than about 70% of the stoichiometric requirements was poor practice as increasing the danger of producing ferrite-type compounds. Even when done under partially oxidizing conditions, such over-roasting is still poor practice although the calcine can be treated in the present process. Under these conditions the sulfur content of the calcine may fall below the 70% requirement, even though the ferrite-type compounds content of the calcine may be nil. The process will handle such concentrates without dissolving an excess of iron. However, the non-ferrous metal extraction generally will not be as good as for a calcine from a less stringent roasting. Such a practice is shown in the following example.

EXAMPLE 6

An over-roasted copper-nickel-cobalt flotation concentrate assaying about:

| Assay, percent by Weight | Parts S Required per 100 Parts Roasted Concentrate |
|---|---|
| Cu—26.6 | 13.3 |
| Ni—4.95 | 2.74 |
| Co—0.88 | .47 |
| Fe—35.57 | |
| Total S—10.0. | [1] 16.51 |
| S as $SO_4$—2.36. | |

[1] Required total for Cu, Ni and Co.

was taken as illustrative of the treatment of an over-roasted concentrate having a sulfide deficiency and total sulfur deficiency of 6.5/16.5 or 39.5%. Several series of samples were leached for about one and one-half hours, at 230° C. and with an initial $O_2$ partial pressure of 200 p. s. i. g., with various liquors to illustrate the effect of supplying the sulfur deficiency in various ways. In each series the roasted concentrate was slurried in just enough 4% aqueous $H_2SO_4$ to meet the stoichiometric sulfur deficiency. In the first series no other additions were made; in the second, 2.8 parts of additional sulfur per 100 parts of roasted concentrate was supplied as $(SO_4)^{--}$ ions by additional $H_2SO_4$; in the third, enough unroasted concentrate to supply an excess of 3.8 parts of sulfide sulfur above its own stoichiometric requirements per 100 parts of roasted concentrate was added. Averaged results from leaching are shown as illustrative in the following table:

Table II

| Series | Percent Metal Extraction | | |
|---|---|---|---|
| | Cu | Ni | Co |
| 1 | 86 | 82 | 80 |
| 2 | 94 | 89 | 88 |
| 3 | 90 | 82 | 83 |

In each case less than 5% of the iron was extracted. From these results it will be seen that the addition of sulfur can be either as sulfide or as sulfate. It will also be seen that even a small excess of either produces a marked improvement in the non-ferrous metals extraction. However, as noted above, too great an excess tends to dissolve more iron also. Above about the 5% limit noted above should in general be avoided. Since the recycle liquor will normally contain about 2–4% acid, one practice is to ignore this amount and simply supply the stoichiometric requirements.

We claim:

1. In a method of metal recovery involving roasting a metal-sulfide-containing ore, subjecting the calcine to oxidation-leaching with an aqueous sulfuric acid-liquor in the presence of oxygen and recovering metal from the leach liquor, the improved method of preconcentrating the nonferrous metal values from a high-sulfur-content metal-sulfide ore, containing ferrous and non-ferrous metal values, which comprises: determining, from the sulfur and non-ferrous and ferrous contents and ratios, the sulfur content for a concentrate of the ore lower than its initial content which will furnish on oxidation to sulfate sufficient heat to maintain the oxidation-leaching reaction rate and will, with any available sulfur in the leach liquor, provide at least stoichiometric equivalents of sulfur to metal sulfates of the non-ferrous metal values; roasting at least a part of the ore under temperature and rate conditions optimum for efficient sulfur removal; stopping the roasting at a residual sulfur content of from about 70% of said stoichiometric requirements to not more than that which will produce about 10% free sulfuric acid in the liquor after leaching; leaching the so-treated material at from about 250° to about 650° F. under an $O_2$ partial pressure of 50–300 pounds per square inch gauge of oxygen, whereby substantially all the oxidizable sulfur is converted to sulfate ions in a low iron-content liquor containing sulfuric acid and a dissolved preconcentrate of nonferrous metal values as sulfates.

2. In a method of metal recovery involving roasting a metal-sulfide-containing ore, subjecting the calcine to oxidation-leaching with an aqueous sulfuric acid-liquor in the presence of oxygen and recovering metal from the leach liquor; the improved method of preconcentrating the non-ferrous metal values from a high-sulfur-content metal-sulfide ore, containing ferrous and non-ferrous metal values, which comprises: determining, from the sulfur and non-ferrous and ferrous contents and ratios, the sulfur content for a concentrate of the ore lower than its initial content which will furnish on oxidation to sulfate sufficient heat to maintain the oxidation-leaching reaction rate and will, with any available sulfur in the leach liquor, provide at least stoichiometric equivalents of sulfur to metal sulfates of the non-ferrous metal values; roasting at least a part of the ore under temperature and rate conditions optimum for efficient sulfur removal; stopping the roasting at a residual sulfur content of from about 70% of said stoichiometric requirements to not more than that which will produce about 10% free sulfuric acid in the liquor after leaching; admixing with said roasted ore any necessary amount of sulfur to produce a sulfur content not less than said predetermined content; leaching the so-treated material at from about 250° to about 650° F. under an $O_2$ partial pressure of 50–300 pounds per square inch gauge of oxygen, whereby substantially all the oxidizable sulfur is converted to sulfate ions in a low iron-content liquor containing sulfuric acid and a dissolved preconcentrate of non-ferrous metal values as sulfates.

3. A process according to claim 2 in which the non-ferrous metals include copper.

4. A process according to claim 2 in which the non-ferrous metals include cobalt.

5. A process according to claim 2 in which the non-ferrous metals include nickel.

References Cited in the file of this patent

UNITED STATES PATENTS

| 345,401 | Wendt | July 13, 1886 |
| 483,639 | Strap | Oct. 4, 1892 |
| 832,176 | Thomson et al. | Oct. 2, 1906 |
| 875,012 | Tixier et al. | Dec. 31, 1907 |
| 1,011,562 | Bradley | Dec. 12, 1911 |
| 1,364,573 | Moore | Jan. 4, 1921 |
| 1,468,806 | Greenawalt | Sept. 25, 1923 |
| 2,197,185 | Kissock | Apr. 16, 1940 |

FOREIGN PATENTS

| 10,500 | Great Britain | of 1914 |
| 338,556 | Great Britain | Nov. 20, 1930 |